July 10, 1951     W. J. BLOOMER     2,560,075
EVAPORATOR
Filed June 14, 1949     4 Sheets-Sheet 1

INVENTOR.
Ward J. Bloomer
BY Nathaniel Ely
ATTORNEY

July 10, 1951 W. J. BLOOMER 2,560,075
EVAPORATOR
Filed June 14, 1949 4 Sheets-Sheet 2

INVENTOR.
Ward J. Bloomer
BY Nathaniel Ely
ATTORNEY

July 10, 1951  W. J. BLOOMER  2,560,075
EVAPORATOR
Filed June 14, 1949  4 Sheets-Sheet 3

INVENTOR.
Ward J. Bloomer
BY Nathaniel Ely
ATTORNEY

July 10, 1951 W. J. BLOOMER 2,560,075
EVAPORATOR
Filed June 14, 1949 4 Sheets-Sheet 4

INVENTOR.
Ward J. Bloomer
BY
Nathaniel Ely
ATTORNEY

Patented July 10, 1951

2,560,075

UNITED STATES PATENT OFFICE 2,560,075

EVAPORATOR

Ward J. Bloomer, Westfield, N. J., assignor to The Lummus Company, New York, N. Y., a corporation of Delaware Application June 14, 1949, Serial No. 98,975

8 Claims. (Cl. 183—80)

This invention relates to entrainment separation method and apparatus.

In my copending applications Serial Number 649,203, filed February 21, 1946, and Serial Number 46,533, filed August 27, 1948, I have described certain apparatus which was particularly adapted for the vortical mixing of two or more liquids or gases or liquids and gases followed by a centrifugal separation of the heavier material.

My present invention which is an improvement on and a modification of the aforesaid inventions is primarily concerned with the separation of small amounts of liquids or solids which may become entrained in large volumes of gases or vapors. It is well known that in many chemical operations minute metallic or liquid impurities may be contained in the gases and although they may be of small gross amount, they may have such a deleterious effect on subsequent refining or purifying operations as to require most careful separation. Scrubbing of such impurities as heretofore suggested has been a difficult operation because of the need of supplemental liquids or substitution of materials and the requirement that these supplemental materials must be removed. Alternatively it has been customary to use electrical precipitators or to use a series of centrifuges which are expensive to supply and difficult to maintain.

It is the principal object of my invention to provide a method and apparatus for removing entrainment from a gas or vapor where the entrainment is of the order of 1% or less and the entrainment may be a liquid or solids or both.

A further object of my invention is to provide an improved form of separator consisting primarily of a fixed cylindrical tuyère having tangential gas directing blades and so adapted that a substantial pressure drop is accomplished through the blades with the formation of a vortical movement of the gases or vapors so as to establish a high centrifugal effect which will throw out any entrained solids or liquids.

A still further object of the invention is to combine a chimney or mist ring with a fixed type tuyère in order that a series of tuyères may be used without tendency to re-entrain discharged impurities.

A still further object of the invention is to provide an evaporator having centrifugal tuyères whereby liquid carried by a petroleum vapor may be separated in such a manner that the released vapors are substantially free of entrainment.

Further objects and advantages of my invention will appear from the following description of preferred forms of embodiment thereof taken in connection with the attached drawings illustrative thereof and in which.

Figures 1, 4:
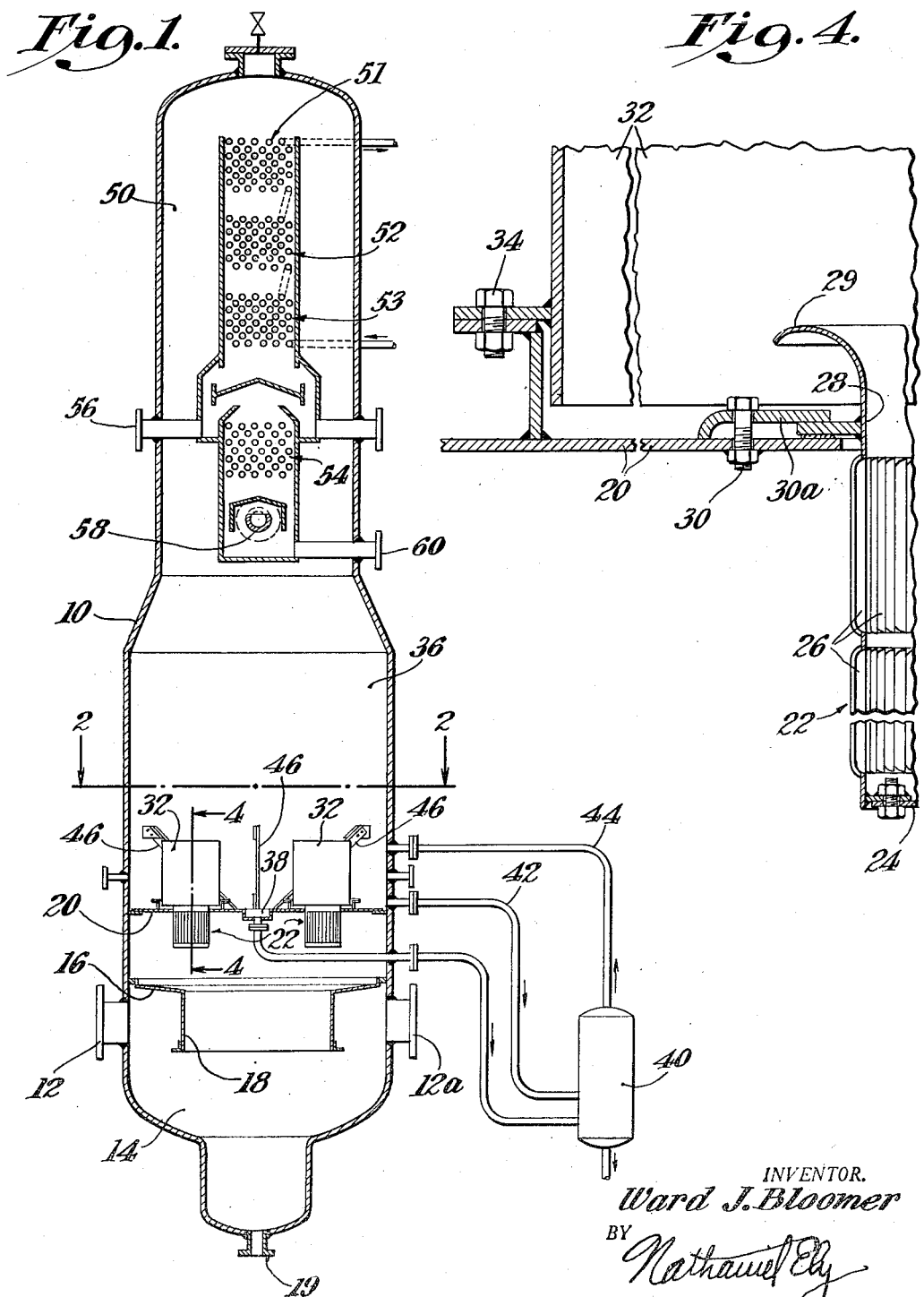
Figure 1 is a substantially central vertical section through an evaporator.
Figure 4 is an enlarged detail in vertical section of the construction shown in Figure 3.

The evaporator generally shown at 10 in Figure 1 is provided with vapor inlets 12 and 12a which enter the lower inlet chamber 14. Preferably this inlet chamber is provided with a central baffle 16 which may have a depending cylindrical chimney section 18 to force the vapors into a downward and then upward path to make a coarse throwout of liquid which may be removed from the sump at 19.

Figure 2:
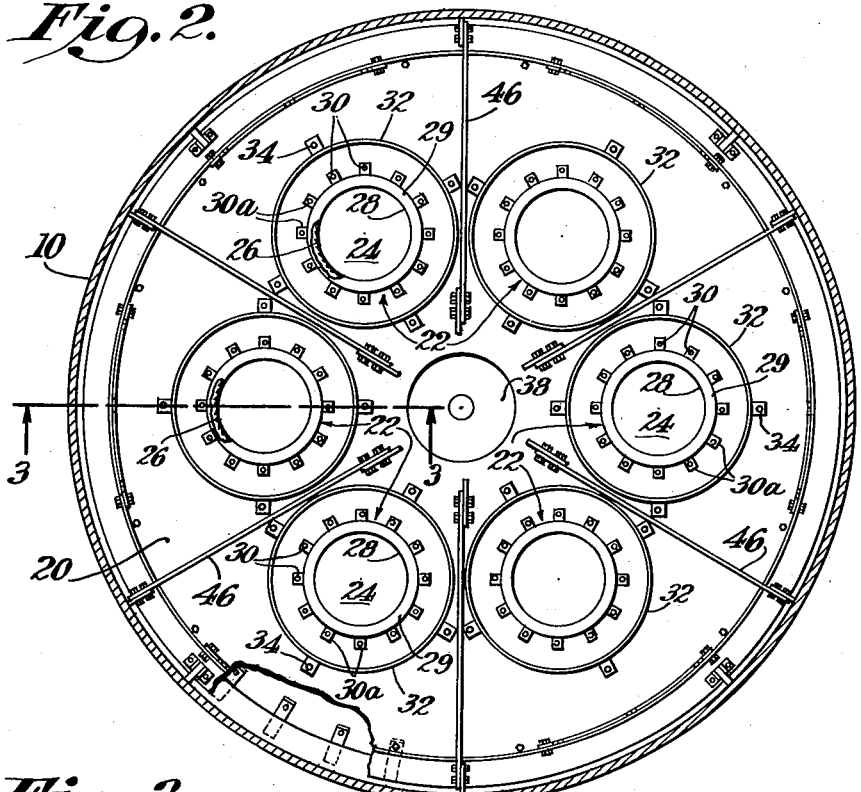
Figure 2 is a substantially horizontal section on the line 2—2 of Figure 1.
Figure 3:
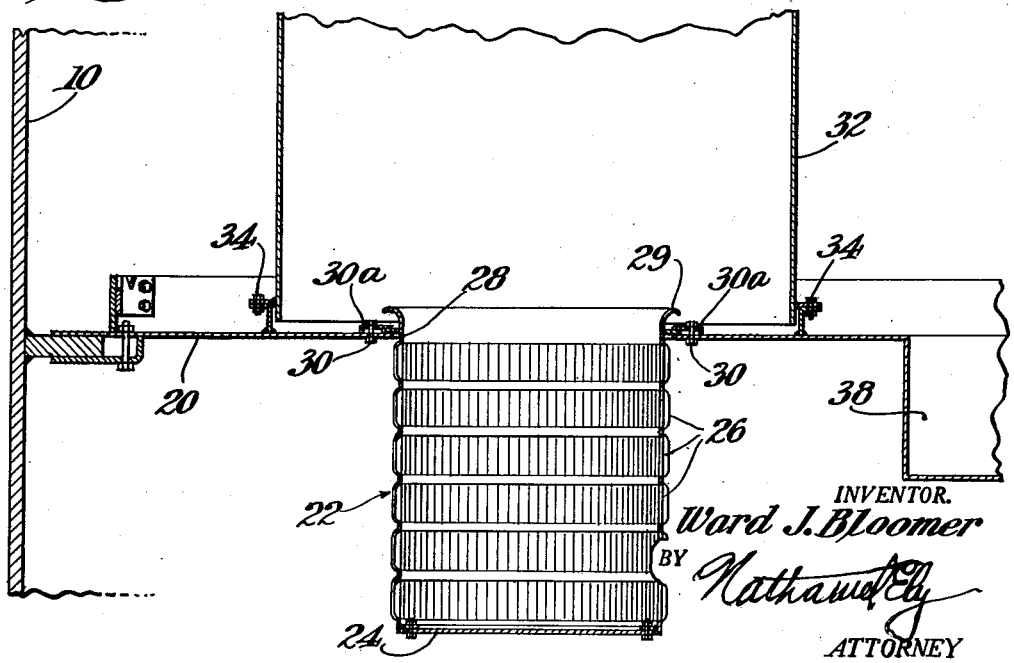
Figure 3 is a substantially central vertical enlarged section through a tuyère and surrounding chamber taken on the line 3—3 of Figure 2.
Figure 5:
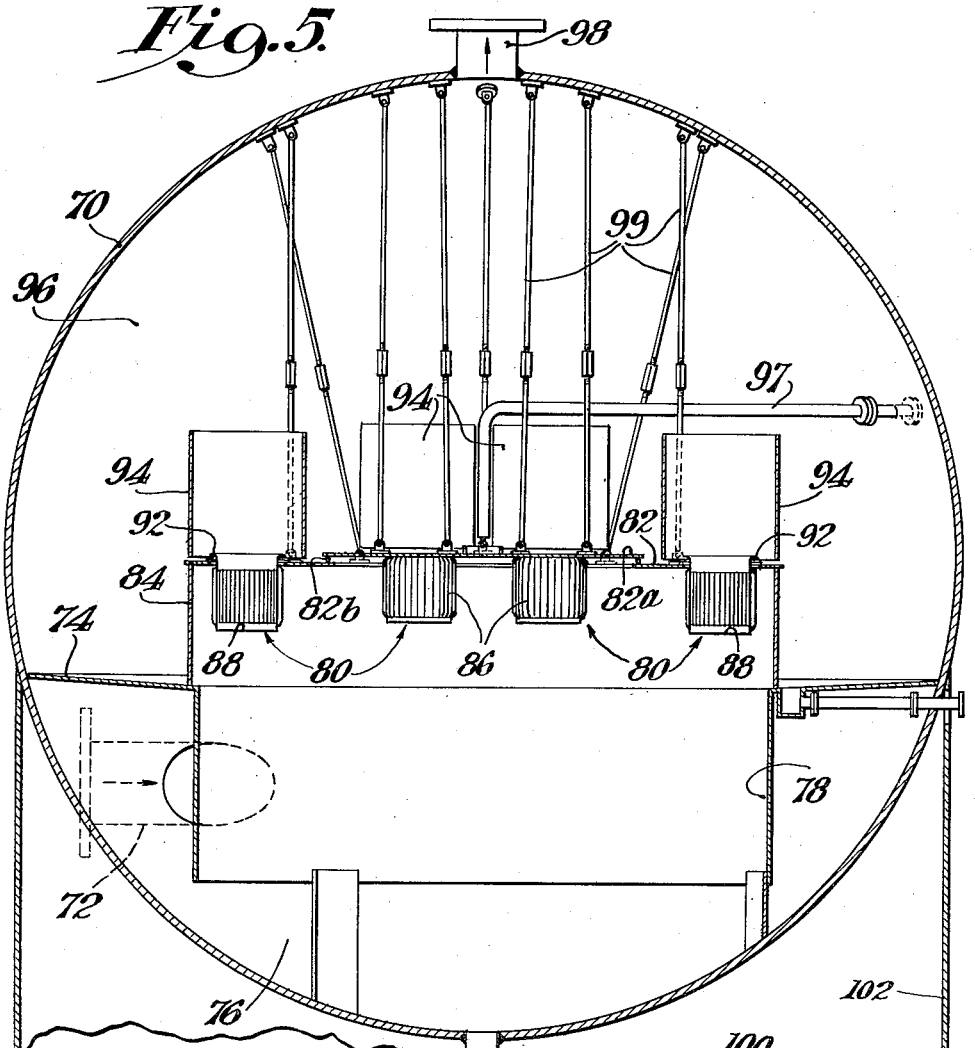
Figure 5 is a substantially central vertical section taken on the line 5—5 of Figure 6 through a modified form of evaporator.

Above the baffle 16 is mounted a secondary baffle generally indicated at 20 which may be provided with a series of entrainment separators embodied as cylindrical tuyères 22, the detail of which is shown in Figures 2 and 3. They are preferably open cylinders having a closed bottom 24 and the side walls are formed by tangential blades 26 the detail of which is shown in Figure 4. The blades are surmounted by a top imperforate portion 28 which is provided with an outwardly and downwardly curved continuous lip portion 29. As shown in Figure 4 as well as in Figure 3, the flared lip portion extends materially above the baffle plate 20 and is of large radius for a purpose as will hereinafter be described.

The tuyères 22 are conveniently made in a series of sections as far as the blades are concerned, the construction shown in Figures 3 having six independent blade sections. This, however, is merely a structural matter as it would also be possible to make continuous blades the full length if the ratio of length to diameter is not too great or if the stiffness is such that fluttering is avoided. It will also be noted that the tuyères are demountably attached to the baffle 20 as by the bolt and clamp member 30 and 30a.

Mounted above the tuyère opening and of a greater diameter is a cylindrical chimney or mist ring 32 which restricts the discharge from the tuyère. As shown in Figure 4 this chimney may also be detachably secured to the baffle or deck 20 as by a flange and bolts 34. It is to be noted that the diameter of this chimney member is substantially greater than the tuyère and in practice I have found it desirable to make this ratio at least 1.6:1 to 2:1 based on the tuyère diameter. It is also to be particularly noted that the lower edge of the chimney 32 is spaced above the baffle a sufficient amount for free liquid passage thereunder.

In operation the vapors which pass downwardly and under the chimney portion 18 thence pass upwardly and through the blades 26 of the tuyères 22 whereby the vapors are given a substantial vortical movement with the vapors progressively passing up through the chimney 32 and thence into the exit zone 36. The narrow slot-like, tangential vapor passages formed in the side walls of a tuyère 22 by the blades 26 all face in the same rotational direction. The velocity of vapors through the blades should be substantial in order to create the upward rising vortex or gas column and I find that a velocity of from 30 to 100 feet per second is desirable. A pressure drop of from 3 millimeters of mercury to 12 millimeters of mercury is necessary for this velocity.

Due to the vortical movement and the high centrifugal effect which can be accomplished by my method, and which may amount to as much as 100 to 200 times gravity, any liquid or solid material carried by the vapors is discharged over the lip 29 and on to the deck of the secondary baffle 20. The progressive curvature of the lip 29 greatly aids this lateral liquid separation. The liquid then may be drawn off through a central sump 38 into a trap tank 40 or it may be drawn off through the side outlet 42. The top of the tank 40 is vented through line 44 back to the evaporator.

The need of chimneys or cylindrical mist rings has proved to be essential to prevent re-entrainment of the liquid thrown out. While the vapors have a general tendency to move upward, the liquid, when freed from constraint, will be thrown more or less laterally and would tend to be re-entrained in the vapors. With the chimney arrangement, closer tuyère spacing can be tolerated. Liquid thrown out by the rotational effect is caught on the chimney and coalesces and runs down the inner wall to a point below that at which it can be re-entrained, and thence it passes onto the deck where it may be removed as desired. Under proper circumstances there is no trace whatever of the entrainment or even of a mist.

In a column as great as is customary in the petroleum industry, which may run as high as 18 ft. in diameter or even greater, I find it desirable to provide a series of tuyères on each baffle or deck and, as shown in Figure 2, six are contemplated. For the volumetric displacement in such a case and to obtain the desired velocity through the tuyère blades which should be at least 30 ft. per second, I find it desirable to use a tuyère of at least 2 ft. in diameter and approximately 2 ft. high. In other words, there are six 4-inch tuyère blade sections as previously mentioned. In such a case, it may be found desirable to support the central portion of the baffle 20 as by a series of tension member generally indicated at 46. These are mounted above the deck of baffle 20 so that there is less opportunity of formation of coke.

After throwing out the impurities and release from the chimney 32, the vapors may then be carried upward through vapor channels 50 and thence downwardly through the heat exchange bundles 51, 52, 53 and 54. The first liquid condensate is trapped out at 56, and a second liquid may be removed at 58, the bottoms liquid being removed at 60.

In a typical case the vapors were from a reduced crude feed and contained less than ½ of 1% of liquid at the temperature of vapor inlet. However, as these vapors were of gas oil quality and were intended for catalytic cracking, this entrained unflashed material such as asphalt was objectionable. In other words, it was found that the catalyst life was measured in hours rather than days of high efficiency and it was essential that the impurities be removed. In a one pass operation through the fixed tuyères it was possible to remove all of the liquid.

The form of construction shown in Figures 5 to 8 is a modification of the invention disclosed by Kraft et al. in application Serial No. 642,560, filed January 21, 1946, and entitled "Flash Chamber," now United States Patent No. 2,489,903, patented Nov. 29, 1949. In this construction the evaporator has no condensing portions and is a sphere generally shown at 70. It is provided with one or more tangential inlets 72 below a central baffle 74 which divides the chamber into the lower inlet zone 76 below the baffle and the vapor outlet zone 96 above the baffle.

In this case, the baffle is provided with a downturned depending cylindrical portion 78 which forces the vapors downwardly and under the edge of the cylindrical portion 78 and thence upwardly where they pass through a series of tuyères 80 carried by the otherwise imperforate deck 82. This is conveniently mounted on the cylindrical portion 84 which rests on the baffle 74 or if there is sufficient diameter of the part 78, the deck 82 may be mounted directly thereon.

Figure 7:
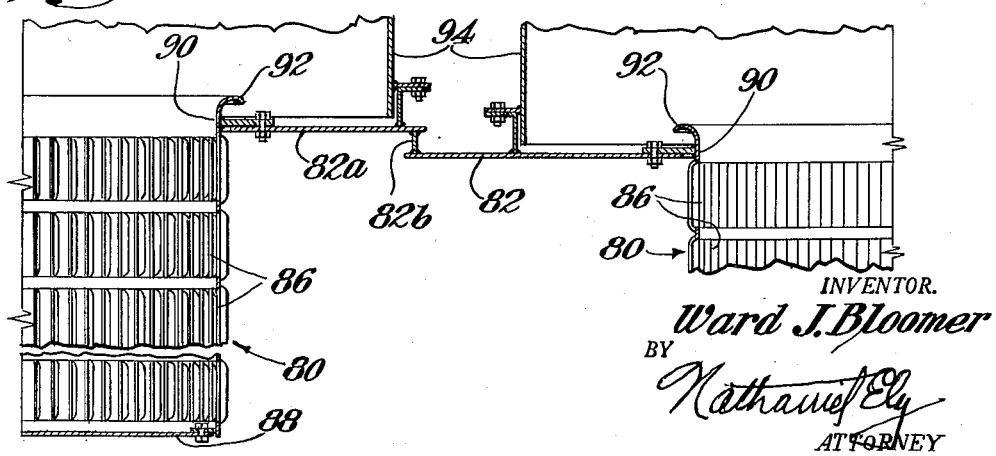
Figure 7 is a vertical section on the line 7—7 of Figure 6.

As in the prior case and as shown in detail in Figure 7, the tuyères 80 are provided with a series of tangential blades 86 and an imperforate bottom 88, the blades 86 terminating in an imperforate cylindrical portion 90 which terminates in a curved lip 92. This lip extends upwardly, outwardly and downwardly from the imperforate portion 90 and is entirely free of the deck 82. Each of the tuyères is also surmounted by a cylindrical chimney or mist ring 94 so that the vapors which pass upwardly and out of the tuyères 80 will pass into the vapor outlet section 96 without any possible re-entrainment of discharged liquid. The dry vapors then discharge from outlet 98 at the top of the hemispherical upper wall, the liquid being discharged at the bottom at 100.

Figure 6:
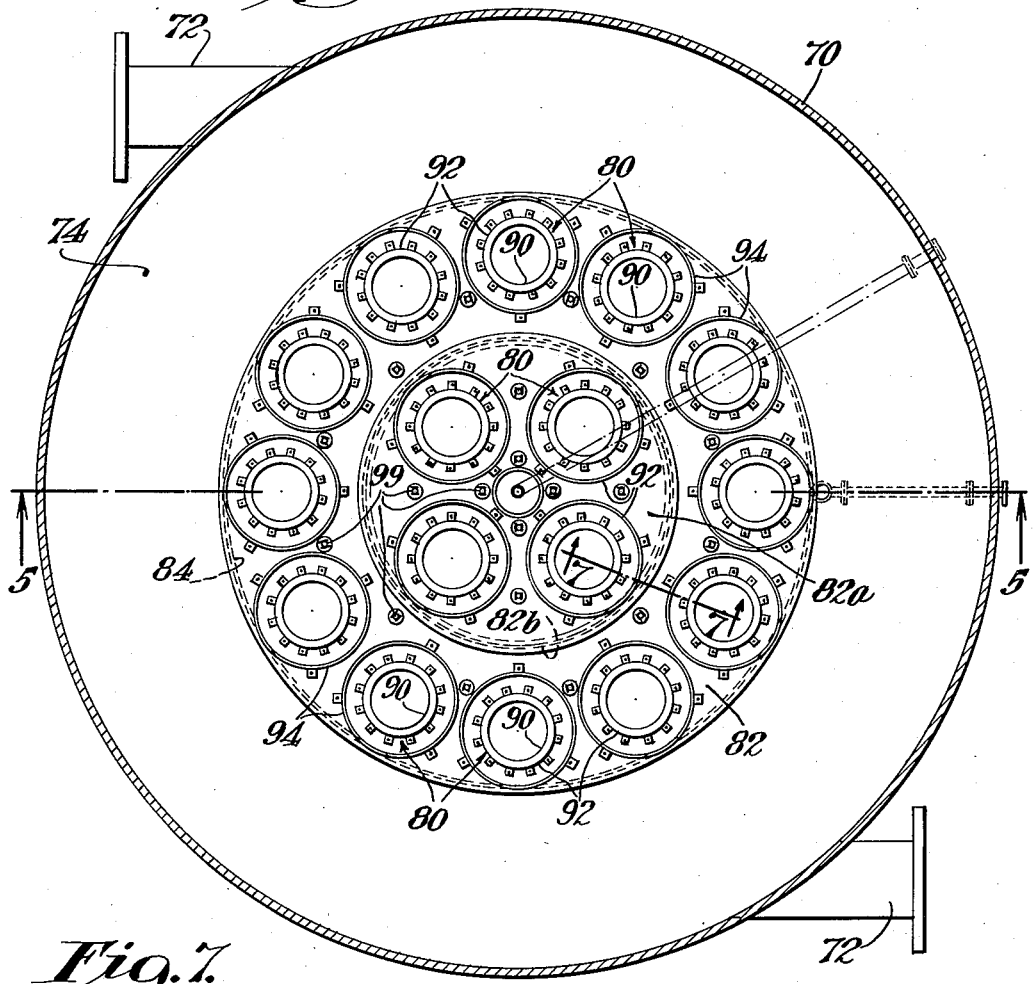
Figure 6 is a substantially horizontal section through the modified form of evaporator shown in Figure 5.

A particular sphere of this type was adapted for a vacuum flasher operation of 35,000 bbls. per day capacity, the sphere being 30 ft. in diameter and having a double row of tuyères as shown in Figure 6. In such case, the central row of tuyères was spaced slightly above the outer row of spheres as shown in Figure 7, the deck portions 82 and 82a being joined by a cylindrical portion 82b. A flushing device 97 was provided to prevent coking on the decks.

In this case, as in the prior case, it was also found desirable to provide supplemental top support for the deck and tuyères as by the tension rods 99 to eliminate any supporting structure below the tuyères. The sphere may be supported by a typical cylindrical skirt or legs as shown at 102.

Figure 8:
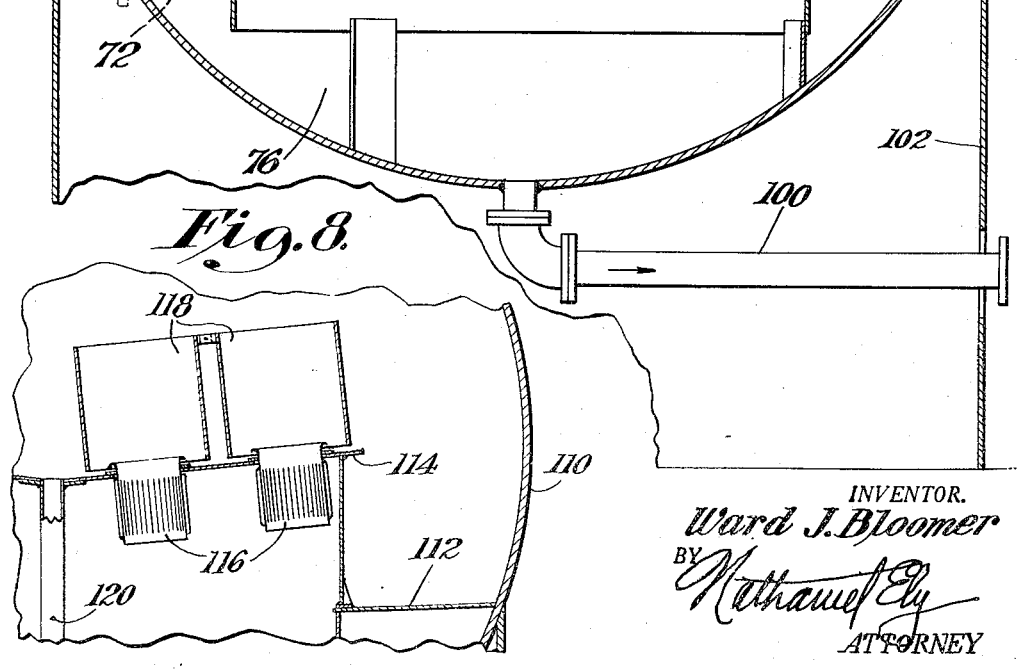
Figure 8 is a partial vertical section of a modified form of construction showing an inclined deck arrangement.

An alternative construction is shown in Figure 8 in which the evaporator 110 which may be of spherical or cylindrical shape and has a transverse deck 112 may be provided with an inclined tuyère deck 114 carrying a plurality of tuyères 116. The tuyère chimneys 118 are coaxial with the tuyères and thus at an inclination to the horizontal. An angle of 5° F. is usually found sufficient for adequate drainage.

The liquids or solids thrown out on the deck 114 may be withdrawn through a central down pipe 120 and in such case separate flushing may not be necessary. This construction also has the essential advantage that there is so substantial hold up of liquid on the deck which might cause premature coking.

While I have shown preferred forms of embodiment of my invention, I am aware that other modifications can be made thereto and I therefore desire a broad interpretation of my invention within the scope and spirit of the description herein and of the claims appended hereinafter.

I claim:

1. A flash chamber having a transverse, substantially horizontal deck therein; a plurality of entrainment separators mounted in and dependent from the deck, said entrainment separators each comprising a cylindrical tuyère having a closed lower end wall and being wholly open at the opposite end, the side wall being formed with a plurality of narrow inwardly directed blades arranged to define slot-like tangential vapor passages, all of which passages face in the same rotational direction, and said tuyères each having coextensive with its open end a flared downwardly curved peripheral lip; means to introduce a vapor through said vapor passages between the blades and out said open ends to form a vapor vortex in each of said tuyères; said lip extending at least out of the vapor vortex path whereby coalesced liquid will be carried over the lip, and means to collect heavier-than-vapor particles discharged from said lips.

2. Apparatus for removing small amounts of entrained liquid impurities from large quantities of vapor or gas, which apparatus comprises a chamber; a partition baffle dividing the chamber into a vapor or gas entrance zone and a vapor or gas exit zone; a cylindrical tuyère mounted in the baffle and dependent therefrom, said tuyère having a plurality of relatively narrow spaced blades arranged to form slot-like tangential passages in the side wall thereof, all of which passages face in the same rotational direction to form converging gas or vapor paths within the tuyère, the dependent end of said tuyère being entirely closed and the opposite end being wholly open and formed with an imperforate end portion terminating in a coextensive smooth flared lip curved toward the baffle; said lip carrying liquid coalesced by the imperforate end portion, out of the vapor or gas path, and an open ended cylindrical chimney member concentrically surrounding the lip of the tuyère in spaced relation and terminating a distance from the baffle sufficient to permit removed impurities to pass therebetween.

3. Apparatus as defined in claim 2 in which the cylindrical member has a diameter at least 1.6 times the diameter of the tuyère.

4. Apparatus as defined in claim 2 in which a plurality of tuyères are mounted on the partition baffle at spacings such that the cylindrical chimney members do not touch but are so close that the throwout of impurities without restraint by the chimney members would cause a re-entrainment with the vapor or gas.

5. A vacuum flash tower of spherical shape provided with a lower vapor inlet and an upper vapor outlet and having a central horizontal deck; a plurality of closely spaced, whirl promoting entrainment separators mounted in and dependent from the deck, each of said entrainment separators comprising a hollow cylindrical shell that is entirely closed at the bottom and wholly open at the top, the side wall of said shell being formed of a series of relatively narrow tangentially disposed spaced blades arranged to form slot-like vapor openings, all of which openings face in the same rotational direction, whereby the vapors passing through the entrainment separators will be given an upward rising vortical path of high centrifugal effect adjacent the respective shells of the entrainment separators and thereby forming in each a central low pressure zone; an open ended cylindrical sleeve member concentrically surrounding the open end portion of each cylindrical shell in spaced relation and terminating a distance above the deck sufficient to permit liquid to pass therebetween; baffle means extending from the wall of the tower above the vapor inlet to the edge portion of the central deck to direct vapors toward the slot-like openings of the entrainment separators, and means to remove liquid thrown out of the vapors and discharged on the deck.

6. The combination defined in claim 5 in which each cylindrical shell has a flared and downwardly curved continuous lip contiguous with its top end.

7. A flash chamber of the class described having a hemispherical upper wall, a vapor outlet therein, an inlet nozzle in the lower part of said chamber, and a central transverse partition baffle having a plurality of whirl promoting, liquid vapor entrainment separators mounted in the baffle and dependent therefrom, each of said separators comprising a substantially cylindrical hollow tuyère having a plurality of relatively narrow spaced blades arranged to form slot-like tangential vapor passages in the side wall thereof, all of which passages face in the same rotational direction, the bottom of each of said tuyères being entirely closed and the top being wholly open and in sealed relation to the baffle whereby vapors passing through the entrainment separator will be given an upward rising, relatively rapid vortical path, said baffle serving as a liquid collector for liquid thrown out of the vapors discharging from the tuyères, an open ended chimney member surrounding the open end portion of each tuyère in spaced relation and spaced above the baffle a distance sufficient to permit liquid to pass out onto the baffle, and means to draw off liquid from said baffle.

8. A flash chamber of the class described having a hemispherical upper wall, a vapor outlet therein, an inlet nozzle in the lower part of said chamber, and a central transverse partition baffle having a plurality of whirl promoting, liquid vapor entrainment separators mounted in closely spaced relation in the baffle and dependent therefrom, each of said separators comprising a substantially cylindrical hollow tuyère having a plurality of relatively narrow spaced blades arranged to form slot-like tangential vapor passages in the side wall thereof, all of which passages face in the same rotational direction, the bottom of each of said tuyères being entirely closed and the top being wholly open and formed with a smoothly flared downwardly curved lip disposed above the baffle, whereby vapors passing through the entrainment separator will be given an upward rising, relatively rapid vortical path and released above the baffle, said baffle serving as a liquid collecting trap for liquid thrown out of the vapors discharging from the tuyères, an open ended chimney member surrounding the lip of each tuyère in spaced relation and terminating above the baffle a distance sufficient to permit liquid discharge, means to draw off liquid from said baffle, and a flushing device arranged to apply liquid to the upper side of the baffle adjacent the chimney members.

WARD J. BLOOMER.

REFERENCES CITED

The following references are of record in the file of this patent:

UNITED STATES PATENTS

| Number | Name | Date |
|---|---|---|
| 1,022,441 | Roderick | Apr. 9, 1912 |
| 1,883,908 | Hawley | Oct. 25, 1932 |
| 1,930,476 | Hawley | Oct. 17, 1933 |
| 2,489,903 | Kraft et al. | Nov. 29, 1949 |
| 2,511,190 | Wright | June 13, 1950 |